No. 735,016. PATENTED JULY 28, 1903.
E. E. DITCH & F. M. HAWKINS.
SEPARATOR SIEVE.
APPLICATION FILED JAN. 10, 1903.
NO MODEL. 2 SHEETS—SHEET 2.
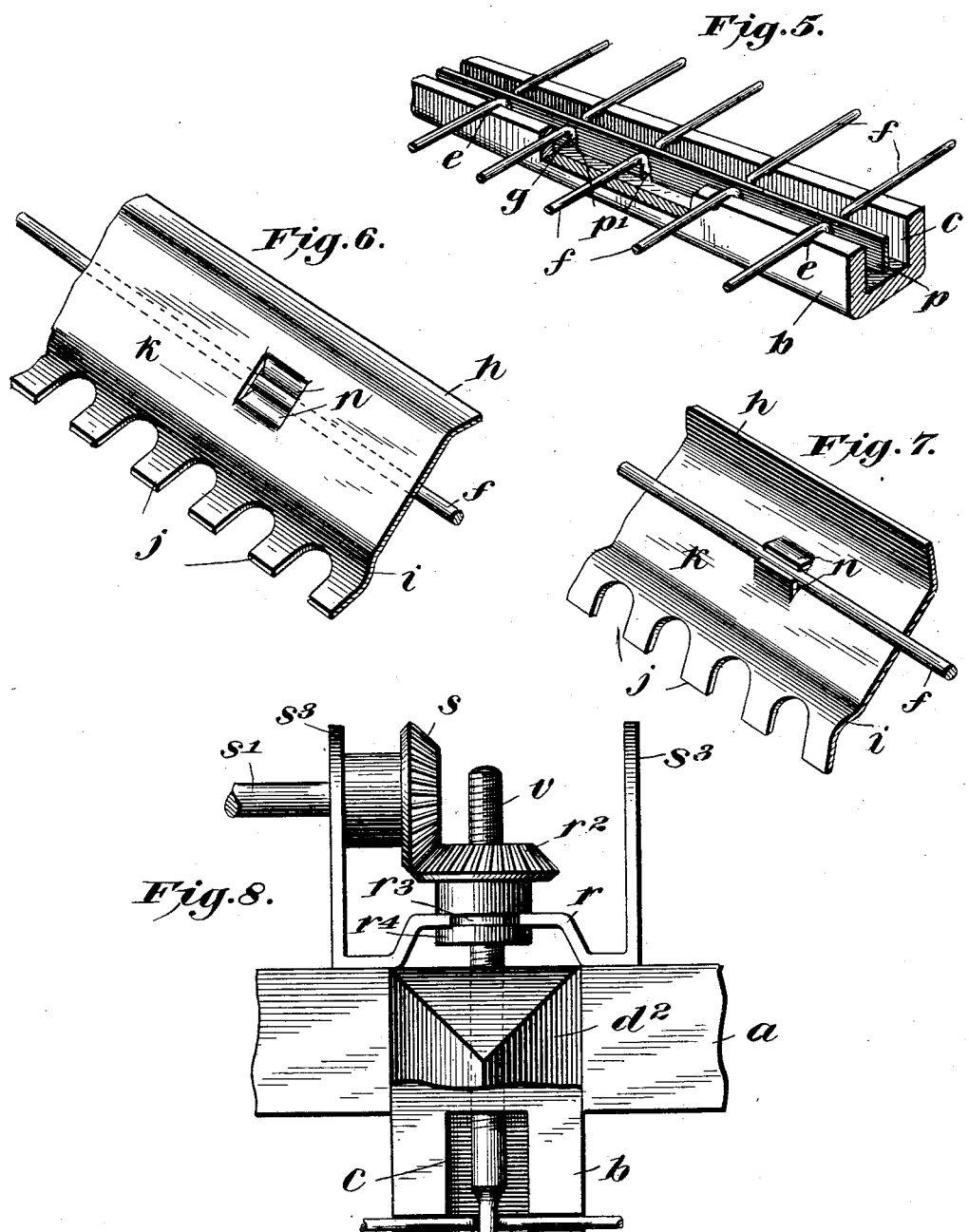

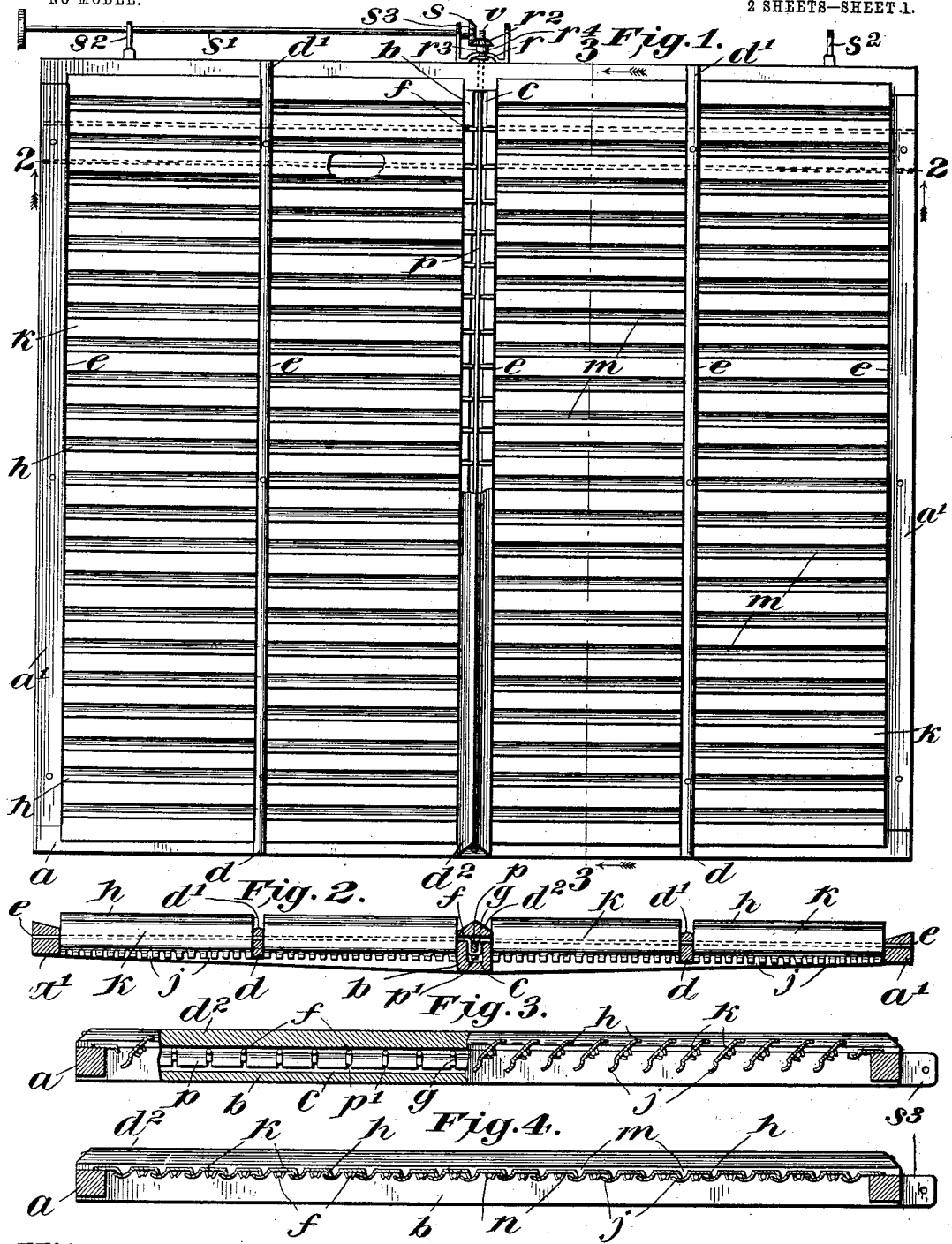

No. 735,016. Patented July 28, 1903.

UNITED STATES PATENT OFFICE.

ELMER E. DITCH AND FRANK M. HAWKINS, OF MANSFIELD, OHIO; SAID DITCH ASSIGNOR TO JAMES N. PATTERSON, OF MANSFIELD, OHIO.

SEPARATOR-SIEVE.

SPECIFICATION forming part of Letters Patent No. 735,016, dated July 28, 1903.

Application filed January 10, 1903. Serial No. 138,463. (No model.)

*To all whom it may concern:*

Be it known that we, ELMER E. DITCH and FRANK M. HAWKINS, citizens of the United States, and residents of Mansfield, in the county of Richland and State of Ohio, have invented new and useful Improvements in Separator-Sieves, of which the following is a specification.

Our invention relates to separator-sieves of the adjustable type; and it consists in improvements of the construction of Letters Patent No. 579,793, granted to Elmer E. Ditch, bearing date of March 30, 1897, filed October 12, 1896, Serial No. 608,610, for a separator.

The objects of our improvements are, first, to provide a sieve for separators having slats mounted upon a series of crank-shafts which are journaled to a suitable frame in such a relative position to each other as to provide a means of opening, closing, and varying the opening or mesh between them simultaneously through the medium of a suitable connecting-bar, by means of which all sizes and kinds of grains, seed, and grasses can be separated from the chaff and cleaned with one sieve, thereby obviating the necessity of using a separate sieve of a different mesh for each size or kind of grain, &c., threshed; second, to construct a slat for sieves of such a form or contour, with the lower edge thereof serrated, as will retard the travel of the grain upon the surface, thereby permitting the air-blast which is used in conjunction with the sieve in cleaning the grain to perform the function of separating the chaff from the grain to expend its force in so doing for a longer period of time; third, to provide a sieve composed of a series of slats mounted to oscillate, swing, or partially rotate upon a series of shafts journaled to a suitable frame in such a manner as to present a series of openings in line with the direction of the air-blast; fourth, to provide a means of varying the openings between the slats that can be operated from either side of the separator when it is in operation; fifth, to provide a method of constructing a sieve whereby the cranks and connecting-bar are securely inclosed, preventing the grain or chaff from interfering with the adjusting mechanism of the slats. We attain these and other objects by the construction illustrated in the accompanying drawings, in which—

Figure 1 is a top view of the sieve, showing the slats closed, with a portion of the slat and center rib broken away. Fig. 2 is a cross-sectional end view taken on the line 2 2 of Fig. 1, showing the slats open and end view of the slotted or grooved center journal-bar. Fig. 3 is a cross-sectional side view of the sieve, taken on the line 3 3, with one of the sides of the center journal-bar removed, showing the slats as they appear with the openings between each series of slats. Fig. 4 is a similar view showing the slats in closed position. Fig. 5 is a perspective view of a section of the center-bar journal in perspective with a portion of one side broken away, showing the method of connecting the cranks whereby the openings between the slats are varied simultaneously. Figs. 6 and 7 respectively are perspective views of sections of a slat, showing the form and method of attaching the slats to the crank-shafts. Fig. 8 is a top plan view in detail of the adjusting mechanism.

The frame $a$ is preferably made rectangular and is adapted to fit the shoe of a separator. A center bar or brace $b$, having a longitudinal groove or slot $c$ formed therein, is securely fastened to the center of the frame. Two intermediate bars $d$ $d$ are securely attached to the frame between the center bar and side pieces $a'$ of the frame. These bars in conjunction with the frame constitute the framework, upon which the adjusting mechanism and slats are mounted. The framework is provided with a series of bearings $e$, made in direct alinement with each other and at a predetermined distance apart. Crank-shafts $f$, having one or more sections of slats securely attached thereto, are journaled in the bearings, leaving the cranks $g$ depending in the groove of the center bar. The slats are journaled with the upper edge $h$ bent downward on an incline. The lower edges of the slats are serrated. A portion $i$ of the lower edge of the slats is bent downward to correspond with the upper edge of the slat, and the serrated edge $j$ is upturned, forming a depressed portion to receive the downturned upper end $h'$ of the adjoining slat when the slats are in closed position, as shown in the drawings. This form of contour of the slat leaves a plane furface $k$ between the turned edges of the slat. The crank-shafts are journaled in the framework of the sieve, so as to leave the upper edges of the slats, which are attached thereto, overlapping the serrated edges of each succeeding slat. It will be noted that the upper edge of the slat which is bent downward and the downturned portion of the lower edge form a series of troughs $m$, into which the grain is deposited after leaving the plane surface $k$ of the slat before passing through the mesh of the sieve, which is composed of the serrated edges of the slats. The grain in passing over the plane surface of the slats and in being retarded in its travel by the contour or form of the slats is subject to the separation process of the air-blast for a longer period of time than it is possible to accomplish by the use of the ordinary sieve, resulting in a more thorough separation of the chaff from the grain. The shafts are journaled in bearings $e$, which are provided in the center bar, intermediate bars, and side pieces. We prefer to make the slats in four separate sections, as shown in the drawings. These sections, which form the completed slat, are secured to the shaft in direct alinement with each other by any ordinary fastening means. We prefer to attach the slats to the shafts by depressing a portion $n$ of the plane surface of the slats, making it project below the surface. The center portion $n$ is cut out and each side made to form a bearing for the slat. Each section of the slat is securely attached to the shaft by solder, which is poured in the bearing. The cranks $g$ of the shafts are connected together by means of a connecting-bar $p$, having a series of notches $p'$ provided in one edge and adapted to fit the cranks of each shaft and form a support for the connecting-bar. One end $q$ of the connecting-bar is screw-threaded and projects through an aperture provided in one end of the frame.

A U or similarly shaped bearing $r$ is attached to the frame and forms a journal for a bevel-gear $r^2$, which is provided with a screw-threaded aperture in the center of the hub and adapted to fit the screw-threaded exterior of the connecting-bar. The bevel-gear is journaled in the bearing and prevented from longitudinal movement by means of an annular groove $r^3$, which is formed in the hub $r^4$ of the gear, into which groove are received the arms $r$ of the bearing, which permits the bevel-gear to be rotated on the screw-threaded portion of the connecting-bar. When the bevel-gear is rotated, a reciprocating motion is imparted to the connecting-bar, which is connected to the cranks of the shafts, thereby varying the openings between the slats simultaneously to conform with the size or kind of grain it is desired to separate. A similar beveled gear $s$ is fitted to one end of a suitable shaft $s'$ and securely attached thereto by means of a pin, which passes through apertures in the hub of the gear and shaft. The gear is adapted to and does mesh with the gear secured to the connecting-bar. One end of the shaft is supported by the bearing $s^2$, and the opposite end is supported by the projecting end $s^3$ of the U-shaped bearing. It will be noted that the U-shaped bearing has two projecting ends, the purpose of which is to afford facilities for adjusting the slats from either side of the separator. This is accomplished by changing the gear and shaft to the opposite side of the frame and securing them to the frame in the same manner as described. The bearings in the frame, which support the crank-shafts, are made to fit the crank-shafts and of such a depth as will leave the periphery of the shafts flush with the surface of the framework. Ribs $d'$ and $d^2$ are provided and secured to the frame by any suitable fastening means directly over the bearings, forming a complete journal for the shafts. The center bar, in connection with the rib $d^2$, forms a complete case for the connecting-bar and cranks of the shafts, preventing the chaff and grain from interfering with the adjusting mechanism. In mounting the slats on the shafts as described the openings between them are brought in a direct line with the air-blast, giving the air free and unobstructed passage, thereby facilitating the cleaning process.

Slight changes and modifications can be made in constructing the sieve without deviating from the principle involved in our invention.

What we claim as our invention, and desire to secure by Letters Patent, is—

1. A sieve comprising a frame, crank-shafts extending across the frame and journaled therein and having slats attached thereto, the cranks entirely incased in a cross-bar of the frame and a draw-bar similarly incased and connected to the cranks whereby to simultaneously rock the slats when moved endwise.

2. A sieve comprising a frame, crank-shafts journaled in open bearings in one side of the cross-bars of the frame and the cranks extending toward the opposite surface of the frame and confined between the two surfaces of the frame, said shafts having slats attached thereto and a draw-bar entirely incased between the surfaces of the frame and connected with the cranks whereby to move the slats simultaneously when reciprocated, and cleats secured to the cross-bars of the frame over the bearings to confine the shafts therein.

3. A sieve comprising a frame having a hollow central cross-bar which has the triple function of a brace, a casing and bearing, crank-shafts journaled in the several cross-bars of the frame, the cranks extending into the hollow central cross-bar, and a draw-bar located within this hollow cross-bar and connecting the shafts, and slats attached to the shafts.

4. A sieve comprising a frame composed of side, end and cross bars, crank-shafts journaled in the end and cross bars, slats attached to the shafts, and a draw-bar connected with the cranks and extending through one of the side bars between the planes of the two surfaces of the frame, and means located between the same planes for moving the draw-bar endwise.

5. A sieve the frame of which is composed of side, end and cross bars, in combination with crank-shafts journaled in the end and cross bars, slats attached to the shafts, a draw-bar extending through a side of the frame in the plane between the surfaces of the frame and connected with the several cranks of the shafts, the outer end of the draw-bar screw-threaded, a gear-wheel swiveled to the side of the frame, and having a threaded bore which turns on the threads of the draw-bar, and means near either side of the frame to carry operating means for said gear to cause the draw-bar to move endwise, whereby to simultaneously turn the shafts and connected slats.

6. A sieve comprising a frame, crank-shafts, slats secured to the shafts, a draw-bar connected to the cranks, said draw-bar having a screw-threaded outer end which protrudes beyond the end of the frame, a bevel-pinion circumferentially grooved and having a threaded bore which turns on the threads of the draw-bar, a pair of brackets secured to the frame having lips which extend into the groove in the pinion and which have bearings, an operating-shaft which turns therein, and a bevel-pinion removably secured to the shaft and adapted to mesh with the pinion on the draw-bar whereby the latter is turned when the shaft is turned to cause the draw-bar to move endwise.

7. A slat for a sieve stamped from sheet metal, and comprising a plane central surface, one edge of which is bent downwardly on an incline and the opposite edge bent downwardly upon an incline in the opposite direction and terminating in serrations, the central plane surface having lips pressed therethrough by means of which the slat is attached to a crank-shaft.

Signed at Mansfield this 1st day of January, 1903.

ELMER E. DITCH.
FRANK M. HAWKINS.

Witnesses:
JOHN H. COSS,
J. N. PATTERSON.